(No Model.)
B. F. WHITTAKER.
EGG TRAY.
No. 441,459. Patented Nov. 25, 1890.
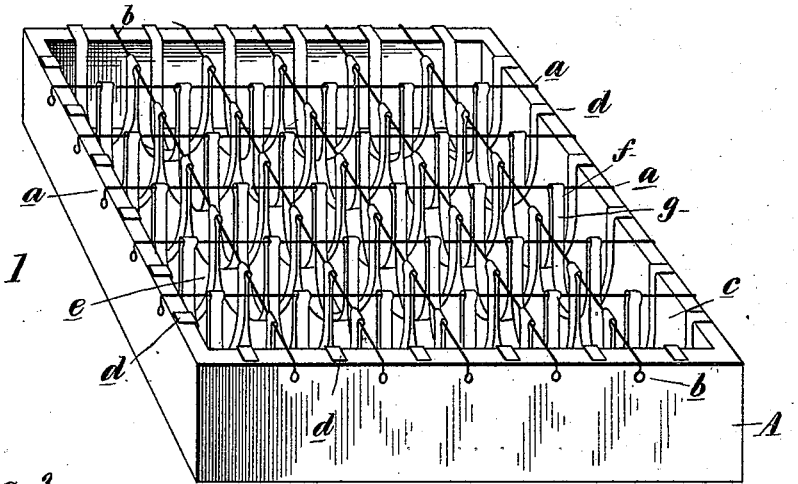
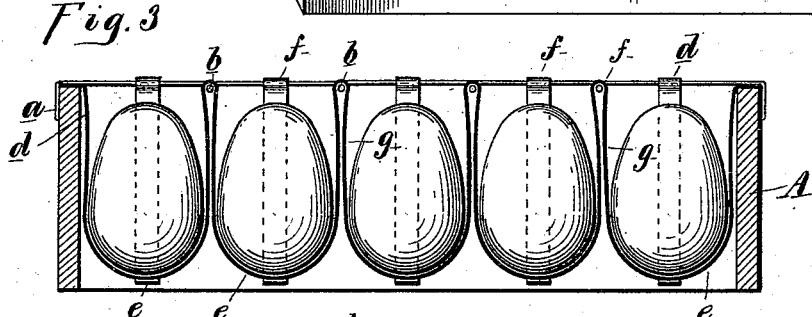
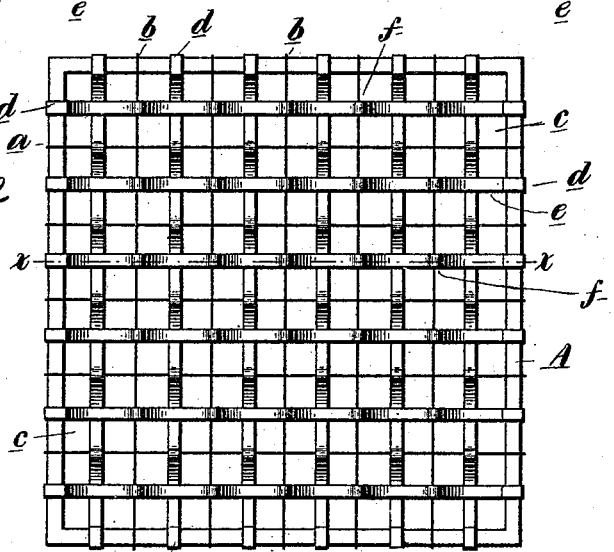
Witnesses:
P. M. Hulbert
M. B. Dogherty
Inventor:
Benjamin F. Whittaker
By James Whittemore
Atty.

UNITED STATES PATENT OFFICE.

BENJAMIN F. WHITTAKER, OF BELLEVILLE, MICHIGAN.

EGG-TRAY.

SPECIFICATION forming part of Letters Patent No. 441,459, dated November 25, 1890.

Application filed August 11, 1890. Serial No. 361,625. (No model.)

*To all whom it may concern:*

Be it known that I, BENJAMIN F. WHITTAKER, a citizen of the United States, residing at Belleville, in the county of Wayne and State of Michigan, have invented certain new and useful Improvements in Egg-Crates, of which the following is a specification, reference being had therein to the accompanying drawings.

This invention relates to new and useful improvements in egg-crates; and the invention consists in the peculiar construction of detachable frames designed to be placed within a box or crate to hold the eggs, and in the peculiar construction of the packages or receptacle in which the eggs are placed, whereby the danger of breakage is greatly obviated and the free ventilation of the entire crate is achieved, all as more fully hereinafter described.

In the drawings, Figure 1 is a detached perspective view of one of the frames removed from the crate. Fig. 2 is a plan view thereof, and Fig. 3 is a cross-section on line $x\,x$ in Fig. 2.

In the drawings I have thought it necessary to show a single frame, as all of the frames are alike and may be secured in the crate or box in any desired or known manner.

A is a rectangular frame, having open top and bottom. To the top of this frame are secured two series of wires $a\,b$, crossing each other at right angles and forming a series of meshes or apertures $c$. Instead of stretching the wire separately upon the box, it may be accomplished by taking a wire screen with the proper size mesh and securing it upon the top of the frame the result being the same. Midway between the wires thus secured upon the frame I secure a series of metal strips (preferably tin) $d$, bent to form loops $e$ and having the stirrup or bearing $f$ formed between these loops and engaging with the supporting-wires. These strips extend parallel with both series of wires, forming a four-sided pocket of substantially U shape suspended from the wires above, within which the egg may be placed, as plainly seen in Fig. 3. It is evident that as these pockets are suspended from the wires, which are supported at their ends only, and in the tin strips, which are likewise supported, any shock or vibration imparted to the frame will not be apt to break the eggs, on account of the elastic support afforded by my construction, the wires and tins being free to vibrate vertically, while the tin strips, being simply bent upon the wires, are free to have a more or less lateral movement sufficient to prevent damage to the eggs. It is also evident that the parallel vertical portions $g$ of the tin strips between the two eggs, as shown in Fig. 3, act as a spring between the eggs to prevent damage from any side concussion. As the strips and wires may be of comparatively similar size, it is evident when a series of these frames are placed within the case, that there is a free circulation of air around all of the eggs, thereby tending to keep the interior as fresh as possible.

What I claim as my invention is—

An egg-carrier consisting of a rectangular frame, a series of parallel flexible wires across the top of the frame and secured to the sides, like series of wires extending across the frame at right angles to the other wires, thin spring metallic strips of a width less than the space between the wires, having substantially U-shaped loops formed in close proximity to each other and passing in opposite directions over the respective wires to form a four-sided pocket with adjacent vertical spring-walls, substantially as described.

In testimony whereof I affix my signature, in presence of two witnesses, this 23d day of July, 1889.

BENJAMIN F. WHITTAKER.

Witnesses:
 A. HAMILTON,
 ED. MCBREARTY.